F. WILLSON & N. BOURQUIN.
GOGGLES.
APPLICATION FILED SEPT. 10, 1912.
1,103,118.
Patented July 14, 1914.
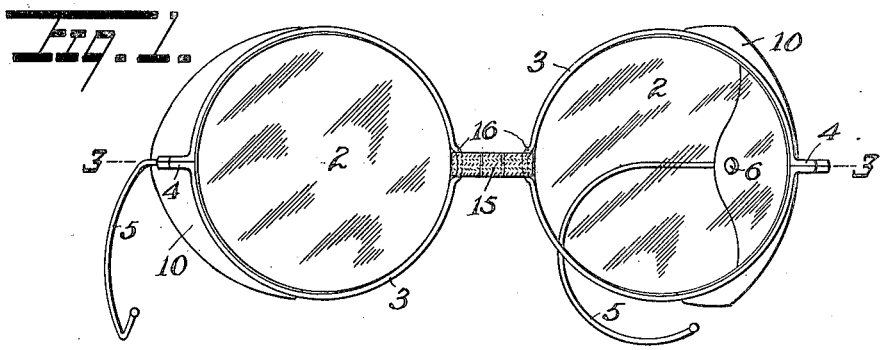
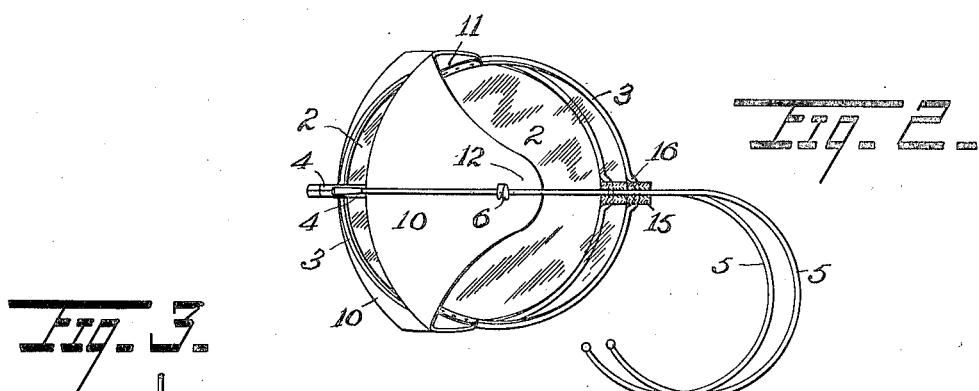
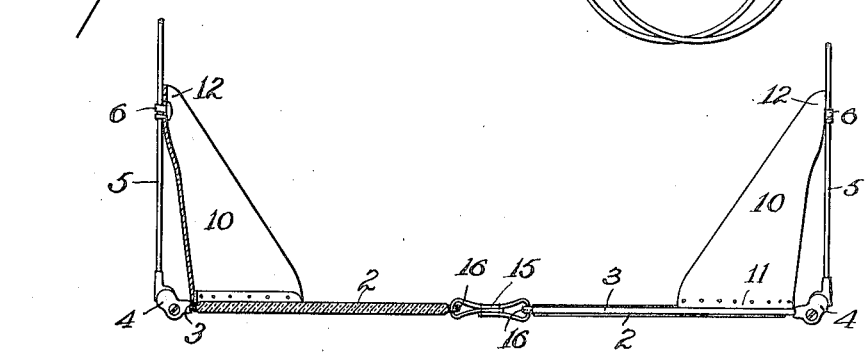
Frederick Willson
Numa Bourquin  Inventors
Witnesses
By
Attorney

UNITED STATES PATENT OFFICE.

FREDERICK WILLSON AND NUMA BOURQUIN, OF READING, PENNSYLVANIA, ASSIGNORS TO T. A. WILLSON & CO., INCORPORATED, OF READING, PENNSYLVANIA, A CORPORATION OF PENNSYLVANIA.

GOGGLES.

1,103,118.  Specification of Letters Patent.  Patented July 14, 1914.

Application filed September 10, 1912. Serial No. 719,524.

*To all whom it may concern:*

Be it known that we, FREDERICK WILLSON and NUMA BOURQUIN, both citizens of the United States, and residents of the city of Reading, in the county of Berks and State of Pennsylvania, have invented certain new and useful Improvements in Goggles, of which the following is a specification.

This invention relates to collapsible goggles, and it consists in the improved construction hereinafter fully described in connection with the accompanying drawings and specifically pointed out in the claim.

Figure 1 is a front view showing the lenses in spread position, one of the temples, with its shield, being fully opened, and the other partially folded. Fig. 2 shows the lenses folded one upon the other so as to permit of conveniently incasing the same. Fig. 3 is an edge view with parts in section and the outer portions of the temple wires broken away.

The enlarged lenses 2, 2 of our improved device are mounted in separate frame eyes 3, 3, each formed of eye-wire with the usual spectacle temple-joints 4, 4 to which the temples 5, 5 are pivotally connected. An eye-shield 10, formed of leather or other flexible material cut to approximately triangular shape, is secured to each lens by clamping the longer-edge portion 11 thereof between the eye-wire and the outer edge of the lens, while the projecting corner portion 12 thereof engages the adjoining temple 5 as shown at 6; the preferred construction indicated corresponding with that particularly described in Patent No. 1,021,175, issued to T. A. Willson & Co., incorporated, on March 26th, 1912. These specially framed lenses are coöperatively connected by means of a flexible-band bridge connection 15, which is secured at each of its ends between the inner edge of a lens and an inclosing eye-wire; a portion 16 of the latter, corresponding with the width of said band 15, being bent slightly outward so as to run substantially parallel with the edge of the lens at just a sufficient distance from the latter to permit of properly engaging the band between the off-setted wire and the lens. This conveniently and economically made connection thus provides flexibility for practically the full distance between the edges of the lenses, thus practically enabling the latter to be readily set in place upon the face of the wearer over the usual spectacles or eye glasses, without unduly spreading the lenses. When out of service the lenses are readily folded so as to bring their outer faces together, and the shields 10, 10 and temples 5, 5 parallel therewith, as shown in Fig. 2, so as to permit of compactly inclosing them in a neat and small sized casing.

We claim—

A collapsible goggle comprising lenses having eye-wire framings, and a flexible-band bridge connection, each of said eye-wires having an outwardly bent portion running parallel with the edge of the lens and forming a narrow passage-way for said flexible-band connection substantially as and for the purpose set forth.

In testimony whereof, we affix our signatures, in the presence of two witnesses.

FREDERICK WILLSON,
NUMA BOURQUIN.

Witnesses:
D. M. STEWART,
W. G. STEWART.